United States Patent [19]

Kaiser

[11] Patent Number: 4,784,319

[45] Date of Patent: Nov. 15, 1988

[54] DELAYED RESPONSE AIR CONDITIONING/HEATING CONTROL SYSTEM

[76] Inventor: Martin L. Kaiser, 15 Old Padonia Rd., Cockeysville, Md. 21030

[21] Appl. No.: 874,509

[22] Filed: Jun. 16, 1986

[51] Int. Cl.$^4$ .............................................. G05D 23/00
[52] U.S. Cl. .................. 236/46 R; 165/11.1; 236/94
[58] Field of Search .......... 236/1 R, 47, 46 R, 94; 165/12, 11.1; 340/545

[56] References Cited

U.S. PATENT DOCUMENTS

| | | | |
|---|---|---|---|
| 3,729,735 | 4/1973 | Dageford | 340/419 |
| 4,035,796 | 7/1977 | Hedly | 340/417 |
| 4,093,920 | 6/1978 | Kaiser | 325/364 |
| 4,338,511 | 7/1982 | Six | 219/497 |
| 4,391,406 | 7/1983 | Fried | 236/47 |
| 4,462,540 | 7/1984 | Dytch | 236/47 |
| 4,485,864 | 12/1984 | Carrell et al. | 236/47 X |

Primary Examiner—William E. Wayner

[57] ABSTRACT

A delayed response air conditioning/heating control system provides a detector which responds to a door or window left open, after a predetermined period of time, and which automatically resets to start time (maximum) if the door or window is closed prior to time of response; otherwise it disables the air conditioning heating system. The system has a wired, or anternatively a wireless, sensor with built-in delay and reset, and a receiver or detector with latching relay and manual relay reset control. If the air conditioning/heating system was operating at the time of disablement, a flashing light indicates this.

4 Claims, 3 Drawing Sheets

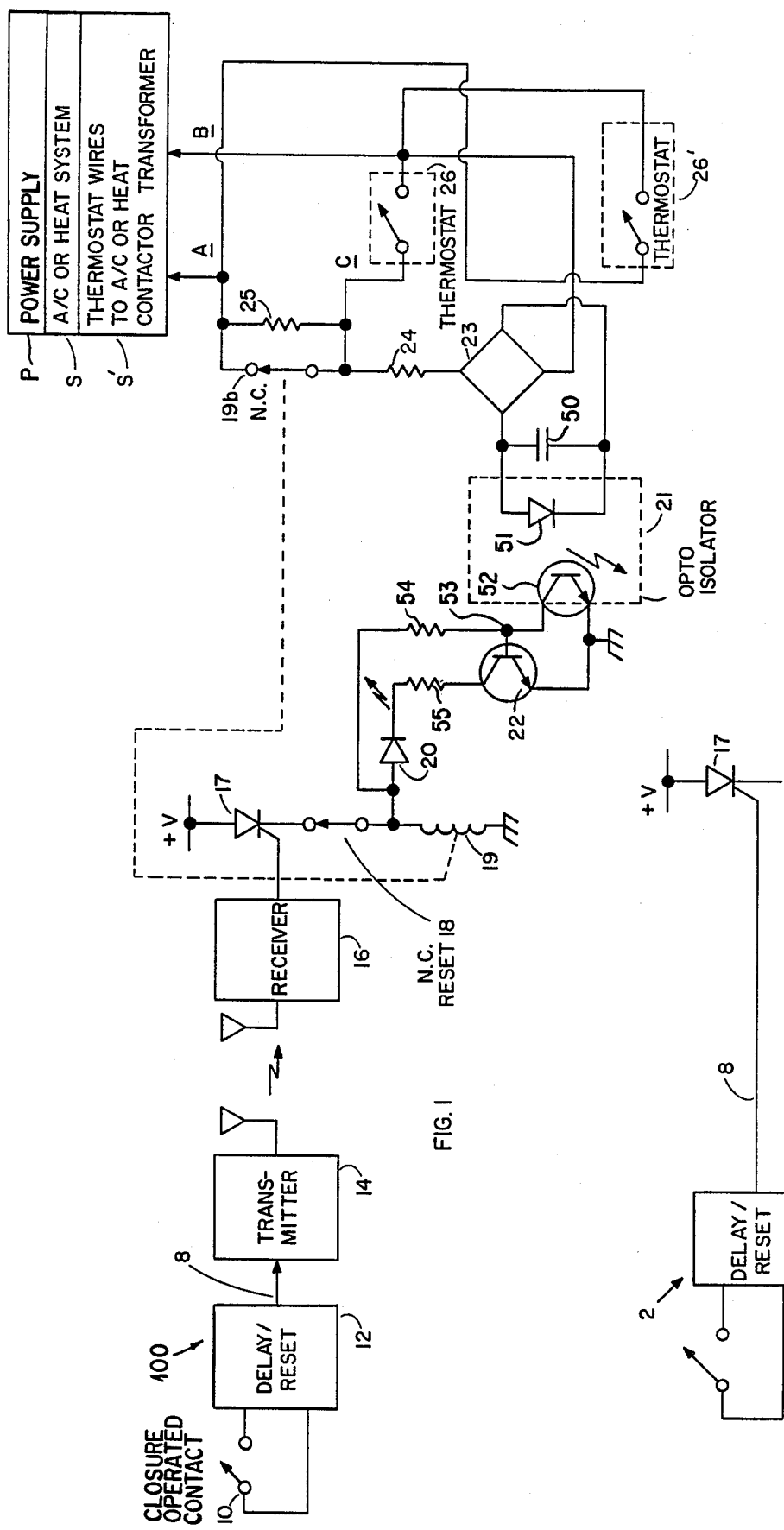

FIG.4
TRUTH TABLE
FOR DELAY/TIMER
OUTPUT SIGNALS

|     | DOOR CLOSED | ← MANUAL TEST | DELAY DOOR OPEN NOT SHUT DOWN | → ← DELAY OVER DOOR OPEN SHUT DOWN |
|-----|-------------|---------------|-------------------------------|-----------------------------------|
| 111 | HI          | HI            | LO                            | LO                                |
| 112 | LO          | LO            | HI                            | HI                                |
| 113 | LO          | LO            | HI                            | HI                                |
| 114 | HI          | HI            | HI                            | LO                                |
|     |             |               |                               |                                   |
| 115 | HI          | HI            | LO                            | HI                                |
| 116 | LO          | HI            | LO                            | HI                                |
|     |             |               |                               |                                   |
|     | TRANS OFF   | TRANS ON      | TRANS OFF                     | TRANS ON                          |

DELAYED RESPONSE AIR CONDITIONING/HEATING CONTROL SYSTEM

FIELD OF THE INVENTION

This invention relates generally to automated control systems and specifically to energy conservation control systems.

BACKGROUND OF THE INVENTION

No system can cool or heat the great outdoors.

A common cause of wasted energy and money occurs when someone, often a tenant, leaves a door or window open when the outside temperature causes a thermostat in the building to signal for change in temperature to compensate for the open door or window.

The problem has been recognized, as for example in the following U.S. patents:

U.S. Pat. No. 3,729,735 issued to E. C. Dageford, 4-24-73, disclosed devices controlled by the opening or closing of a window; a signal is transmitted immediately on opening a window and that signal immediately shuts off a blower which is providing cooling/heating to a given area. When the window is closed, the blower restarts immediately. There are several points to this invention. It is designed for a large industrial cooling-/heating system. When the invention functions it affects only a part of the whole. This invention can not be applied to residential or standard cooling systems because stopping the blower will cause damage to the compressor. The key word in this invention is "immediate". Proper conduct (i.e. opening a window briefly or even for a reasonable period of time) is punished.

U.S. Pat. No. 4,035,796 issued to S. Hedly et al on 7-12-77 disclosed a system similar to that of U.S. Pat. No. 3,729,735 above. When a window is opened the air conditioner/heater is shut down immediately (i. e. normal conduct is punished). A latching feature and audible alarm are also included. This system might be more useful in a prison than in a residence. Again, the key word in this invention is "immediate".

U.S. Pat. No. 4,338,511 issued to J. G. Six on 7-6-82, disclosed a central system that immediately caused a convector to be switched off or to be operated at reduced power on opening of a window, and prevented resumption until the window was again closed. This invention is a good idea for people who accept the same environment or allow someone else to determine their environment. In a rental property situation this is not practical. This invention applies to heating systems only because it is proportional control. An air conditioner is either on or off. In this invention thermistors would have to be wired into several locations. It would be extremely difficult to transmit the thermistor data by wireless means.

SUMMARY OF THE INVENTION

A principal object of the present invention is to provide a system for control of an air conditioning system or of a heating system that will reduce waste caused by opening a window or door, without undue inconvenience or other punishment, by encouraging the tenants of a space to be prompt and aware.

Further objects are to provide a system as described that is easily understood and controlled by users, that is economical to make and install, that is durable and places no undue demands on equipment controlled by it, and that itself requires little power to operate.

Yet further objects are to provide a system that detects when a door or window has been left open and will automatically shut down the air conditioner or heater after a predetermined period of time. If the door or window is closed prior to the shut-down time, the timing is reset to the start time (maximum). When the shut-down time is reached, a signal is transmitted to a receiver with latching relay which turns off the air conditioner or heat. A flashing light indicates when the latching relay is closed. The invention also includes a sensor (opto-isolator) to detect load demand and control the flashing light. If there is no demand for air conditioning or heat the light will not flash; if there is a demand, the light will flash. In order to reset the system after shut-down it is necessary to close the door or window and press a latching relay reset button (switch).

When removing heat may cause freezing problems, a secondary thermostat inaccessible to the casual operator and set at a low minimum temperature may be shunted across the latching relay contacts.

BRIEF DESCRIPTION OF THE DRAWINGS

The above and other objects and advantages of this invention will become more readily apparent on examination of the following description, including the drawings in which like reference numerals refer to like parts.

FIG. 1 is a schematic diagram of a circuit usable in a preferred embodiment according to the invention;

FIG. 2 is a fragmentary showing of a portion thereof in a second embodiment;

FIG. 3 details the re-set timer;

FIG. 4 is a truth table; and

DETAILED DESCRIPTION

Figure 1A:
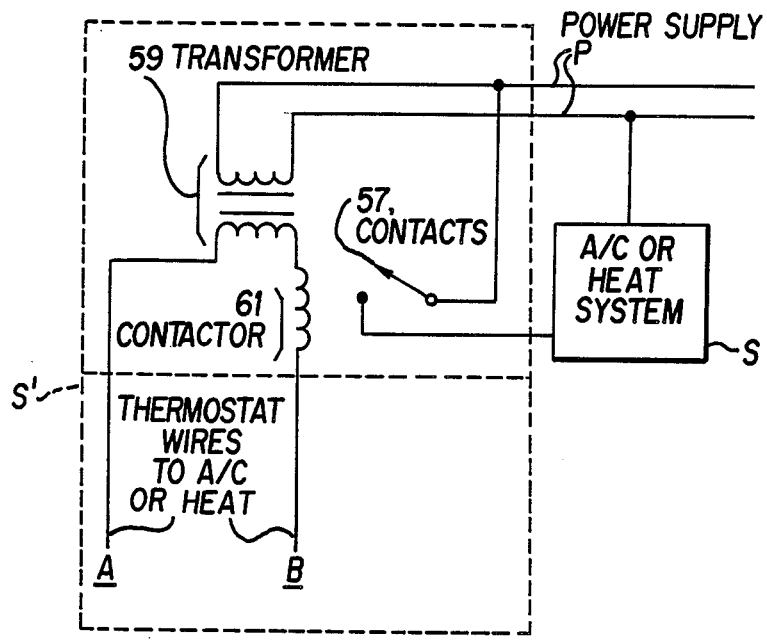
FIG. 1a is a wiring schematic that fits FIG. 1 at A and B, an alternative showing of elements P, S, and S'.

FIG. 1 shows details of the preferred embodiment 100. Components of the system include: a closure-operated contact 10 such as a conventional micro-switch, a delay-reset timer 12, connected as at 8 to a remote radio or ultrasonic or infrared transmitter 14, and a receiver 16 for remotely receiving transmissions from the transmitter 14.

The timer, transmitter and receiver 12 and 14 and 16 may conventionally be powered individually. The receiver is connected so that the output signal passes to the gate of silicon-controlled rectifier 17.

The voltage source at +V connects to ground through the silicon-controlled rectifier 17, the contacts of normally-closed-contact reset switch 18, and the coil of relay 19.

As the dashed line between the coil of relay 19 and the contacts 19b shows, actuating relay 19 opens the normally closed contact 19b.

As noted in FIG. 1 and FIG. 1a, the POWER SUPPLY (P) conventionally supplies power. The CONTACTOR/TRANSFORMER of S' conventionally responds to THERMOSTAT WIRES (A,B), and relays the power to operate the AIR CONDITIONING or HEATER at (S) through the contactor contacts 57.

The contactor/transformer 61, 59 produces A. C. voltage as noted that "is applied through resistors 25 and 24 and diode bridge 23".

Connection by the thermostat wires is provided from the A side of the contactor/transformer through contacts 19b of the relay 19 and at C through thermostat 26, to the B side of the contactor/transformer. The resistor 25 shunts across the contacts 19b. A secondary thermostat 26' is connected across the A and B sides of the contactor/transformer.

A resistor 24 connects through 19b to points A and B respectively through first and second opposed arms of a diode bridge 23 having third and fourth opposed arms connected by a condenser 50 across a diode 51 that is part of the opto isolator 21 to point B. The opto isolator 21 isolates the receiver 16 from the thermostat control circuitry. Transistor 52 as shown is part of the opto isolator circuitry; it and transistor 22 have emitters grounded, as shown.

The collector of transistor 52 connects at 53 to the base of transistor 22 and through current limiting resistor 54 to a point between the coil of relay 19 and the contact switch 18.

From the collector of transistor 22 current limiting resistor 55 connects through LED 20 to the contact of switch 18. As noted above, the invention includes sensor circuitry to detect load demand and control the flashing light. This comprises the described resistors 24, 25, diode bridge 23 and opto isolator connected at A and B. When a closure such as a door or window is opened, it trips a switch 10 that may be a conventional magnetic or micro-switch conventionally installed. The switch 10 starts a preset time period running in a delay/reset timer 12. If the door and/or window is left open until the preset time period lapses, the delay/reset unit triggers a conventional remoted transmitter 14, that may be a radio transmitter or, if desired, an ultrasonic or an infrared transmitter.

The signal from receiver 16 turns on silicon controlled rectifier (SCR) 17. This applies voltage to the coil of relay 19 through the contact of manually operated normally closed contact reset switch 18. Normally closed contacts of relay 19 latch open thereby interrupting the circuit between A and B and shutting down air conditioning (or heating) system S by means of the elements noted at S'.

Flashing light emitting diode (L.E.D.) 20 indicates a wasteful condition.

(1) If the system has not functioned (shutdown) no voltage is available to LED 20 at relay 19 and L.E.D. 20 will not flash.

(2) If the system has functioned (shut-down) and contact at 19b is opened by coil 19 and the thermostat 26 does not call for air conditioning or heat, the A.C. voltage from the contactor transformer P is applied through resistors 25 and 24 and diode bridge 23 to opto-isolator 21. The opto-isolator 21 turns off transistor 22 and flashing L.E.D. 20 will not light.

(3) If the system has functioned (shutdown) and the thermostat 26 does call for air conditioning or heat, no voltage is applied to the opto-isolator 21 which turns on transistor 22 and causes flashing L.E.D. 20 to light.

In summary, the flashing light alerts the operator only when a wasteful demand has been made.

Once the doors or windows are closed manually, pressing normally closed switch 18 resets the air conditioner or heating system. Pressing open switch 18 causes SCR17 to turn off, removing power at relay 19, causing it to drop out, thereby closing contacts 19b and re-starting the air conditioner or heating system.

The values of resistors 24 and 25 are low enough to cause opto-isolator 21 to function and high enough not to hold in the contactor/relay in the air conditioning-/heating unit.

Should injury to the premises appear possible from operation of the system of this invention, as from a shut-down in winter that might cause frozen water pipes or damage to growing plants, a second thermostat 26' can be installed in parallel with thermostat 26 and the control put in an inaccessible place, and set to turn on the heat to attempt to hold a low but safe temperature in the controlled space.

FIG. 2 shows an embodiment 200 in which the signal from the delay/reset 12 is transmitted to the silicon controlled rectifier 17 directly by a wire 8. Construction, operation and result of the remainder of the circuit are as described in reference to FIG. 1.

To summarize my invention:

(1) Normal conduct (reasonable time of opening of doors or windows) is allowed by the automatic reset feature, the time period of which can be pre-set at the property owner's discretion, from the nominal time necessary for a plurality of people to pass through a hinged door, for example, to tens of minutes, if desired.

(2) Abnormal conduct is punished by shutdown of the system conditioning the space environment (by cooling or by heating as the case by may) but only after the set lapse of time. Corrective action must be taken to return to normal conduct, and to reset the system which will, if desired, involve inquiry as to the location of the manual reset button, or at least some inconvenience in arriving at the button.

It will be understood that the terms are used broadly herein, conditioning the environment within a space including temperature modifying by air conditioning or heating; disabling the conditioning means includes turning off or interrupting the conditioning by any suitable means; emitting of the sensory signal including acoustic signalling as by bell, if desired.

FIG. 3 shows that the reset/timer or delay reset in block 12 of FIG. 1 comprises circuitry controlled by a series of NAND gates. At the start of timing cycle (when a door or window opens) output of NAND 111 goes low and that of NAND 112 goes high. This supplies power to the 7555 timer and starts the timing cycle. If the door or window is closed prior to the end of the timing cycle, power is removed from the 7555 timer and the circuit resets to zero time. When power is initially applied the output of the 7555 timer is high. After the delay is complete the output of the 7555 timer goes low, thereby triggering the transmitter 14.

Delay/reset circuitry was referred to in U.S. Pat. No. 4,093,920 issued to Martin L. Kaiser, the present inventor, on 6-6-78.

FIG. 4 is a truth table indicating the two ways to make the transmitter operate:

1. pressing the "manual test" switch, for immediate transmission;
2. letting the circuit do its work, for delayed transmission.

FIG. 1a is a schematic wiring detail of the FIG. 1 "POWER SUPPLY", "A/C OR HEAT SYSTEM"; "THERMOSTAT WIRES TO A/C OR HEAT CONTACTOR/TRANSFORMER". This Figure aligns with FIG. 1 at A and B. When the system is actuated by contact closure of one of the thermostats through the wires of thermostats 26 or 26' (FIG. 1), power from power supply P is conventionally provided through the thermostat wires at A and B and contactor/transformer at S' to close the contactor contacts 57 and turn on the A/C or heat system S, all being well-known and conventional. As noted, opening of relay contacts 19*b* breaks the thermostat circuit and turns off the power.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters patent:

1. A method for reducing waste incident to operation of a system for conditioning the environment within a space having a closure openable to an ambient environment that causes demand on said system through automatic control of operation of said system for conditioning as a result of said closure's being opened, comprising the steps:
    (a) setting a predetermined time limit following opening of said closure;
    (b) ascertaining whether the closure is still open at the end of said predetermined time limit,
    (c)
        (i) if the closure is still open at the end of said predetermined time limit, rendering the system for conditioning inoperative in a manner requiring manual restart;
        (ii) if the closure is closed at the end of said predetermined time limit, abstaining from rendering the system for conditioning inoperative and resetting the predetermined time limit,
    (d) following step (c) (i), ascertaining whether the system for conditioning was operating at the time it was rendered inoperative, and
    (d) (i) if the system for conditioning was operating at the time it was rendered inoperative, emitting a sensory signal indicating that the system for conditioning was operating at the time it was rendered inoperative.

2. In a system for reducing waste incident to operation of means for conditioning the environment within a space having a closure openable to an ambient environment that causes demand on said means for conditionng as a result of said closure's being open, and means responsive to opening of said closure for disabling said operation, the improvement comprising in combination: means for automatically setting a predetermined length of time beginning with an opening of said closure, means for automatically delaying by said predetermined length of time the disabling of said operation, means for preventing the disabling of said operation provided that said closure is reclosed prior to expiration of said predetermined length of time, said means for preventing providing for automatic resetting of said predetermined length of time, when said closure is reclosed prior to said expiration of said predetermined length of time, but not otherwise, means for determining whether said system was operating when said operation was disabled, means for emitting a sensory signal to a user of said space that said means for conditioning was operating when said operation was disabled, and means requiring manual restart to restart said operation following said disabling.

3. In a system as recited in claim 2, said length of time being at least equal to a nominal time required for passage of a plurality of people through a hinged door and for closing said hinged door.

4. In a system for reducing waste in temperature control of a space, the space having temperature modifying means response to temperature changed in the space including those caused by an ambient environment, the space having a closure openable to said ambient environment, the improvement comprising: resettable means for signalling lapse of a predetermined length of time following an opening of said closure, means responsive to said signalling for disabling operation of the temperature modifying means, means for requiring manual restart to restart said operation after said disabling of operation, means for determining whether said system was in operation at the time of said disabling of operation, means for emitting a sensory signal indicating that the system was in operation if the system was in operation at the time of said disabling of operation, and means responsive to closing of said closure within said predetermined length of time for preventing said disabling of operation and for resetting said means for signalling.

* * * * *